United States Patent [19]

Hundstad et al.

[11] 4,126,833

[45] Nov. 21, 1978

[54] HIGH REPETITION RATE METAL HALIDE LASER

[75] Inventors: Richard L. Hundstad; Lelland A. C. Weaver, both of Pittsburgh, Pa.

[73] Assignee: Westinghouse Electric Corp., Pittsburgh, Pa.

[21] Appl. No.: 761,045

[22] Filed: Jan. 21, 1977

[51] Int. Cl.$^2$ .............................................. H01S 3/097
[52] U.S. Cl. ......................... 331/94.5 PE; 331/94.5 G
[58] Field of Search ..................... 331/94.5 G, 94.5 PE

[56] References Cited

U.S. PATENT DOCUMENTS 3,619,812  11/1971  Asmus .................................. 331/94.5

OTHER PUBLICATIONS

Chemical Abstracts, vol. 82, 1975, p. 488, #178086p.
Judd et al., IEEE J. of Quantum Electronics, vol. QE 10, No. 1, pp. 12-20, Jan 1974.

*Primary Examiner*—William L. Sikes
*Assistant Examiner*—Marcus S. Rasco
*Attorney, Agent, or Firm*—M. P. Lynch

[57] ABSTRACT

A transverse gas flow system in combination with physically displaced electrical dissociation and electrical excitation means permits increased pulse repetition rates resulting in increased average power output from a metal halide laser apparatus.

9 Claims, 5 Drawing Figures

HIGH REPETITION RATE METAL HALIDE LASER

BACKGROUND OF THE INVENTION

The use of metal halides to generate high metallic densities at reduced operating temperatures for high energy metal vapor lasers is described in detail in U.S. Pat. No. 3,934,211, issued Jan. 20, 1976, entitled, "Metal Halide Vapor Laser," assigned to the assignee of the present invention, and incorporated herein by reference.

Pulsed laser action at the copper 5106A and 5782A wavelengths has been obtained from discharges through copper iodide: argon mixtures at approximately 600° C. Preliminary experiments in static gases reveal that two electrical discharge pulses, separated by between 50 and 250 microseconds, are required to produce a laser output. The first electrical pulse produces substantially copper iodide dissociation but little laser output, whereas a second, high current pulse excites the dissociated copper atoms and produces substantial laser output. The 50 microsecond minimum delay time required between pulses is believed to be caused by the creation of copper atoms in the lower laser level (1ll) at the time of molecular dissociation. While initially it is difficult to pump a population inversion with respect to the lower laser level population, after approximately 50 microseconds, most of the excited metastable atoms are converted to ground state copper atoms through diffusion to the walls of the laser apparatus, or due to a bulk effect within the medium. At this point, the second excitation pulse can easily excite population inversions, similar to that of the pure copper vapor laser. After approximately 250 microseconds delay, however, the copper atoms recombine with iodine to form copper iodide once again and the double pulse sequence must be repeated to obtain further laser pulses. Thus diffusion times determine the minimum pulse separation, and recombination times determine the maximum pulse separation.

These physical processes place limits upon the laser pulse repetition rates available in static metal halide lasers.

SUMMARY OF THE INVENTION

These is described herein with reference to the accompanying drawings a technique for circumventing the minimum "diffusion time" between electrical excitation pulses in a metal halide laser system, thereby increasing the maximum available pulse repetition rate and average laser power to arbitrarily high values. This is accomplished by superimposing a transverse gas flow on the active laser medium, and arranging the electrical dissociation and electrical excitation pulses so that a minimum 50 microsecond "drift time" occurs between pulses.

The concept of transverse gas flow in a metal halide vapor laser is described in detail in U.S. Pat. No. 3,936,772, entitled "High Flow Metal Halide Vapor Laser", issued Feb. 3, 1976, assigned to the assignee of the present invention, and incorporated herein by reference.

DESCRIPTION OF THE DRAWINGS

The invention will become more readily apparent from the following exemplary description in connection with the accompanying drawings in which.

DESCRIPTION OF THE PREFERRED EMBODIMENT

While the following discussion of a metal vapor halide laser is developed with reference to a copper halide laser apparatus, the disclosed structure and function applies equally to other metal halide lasers.

Figure 1:
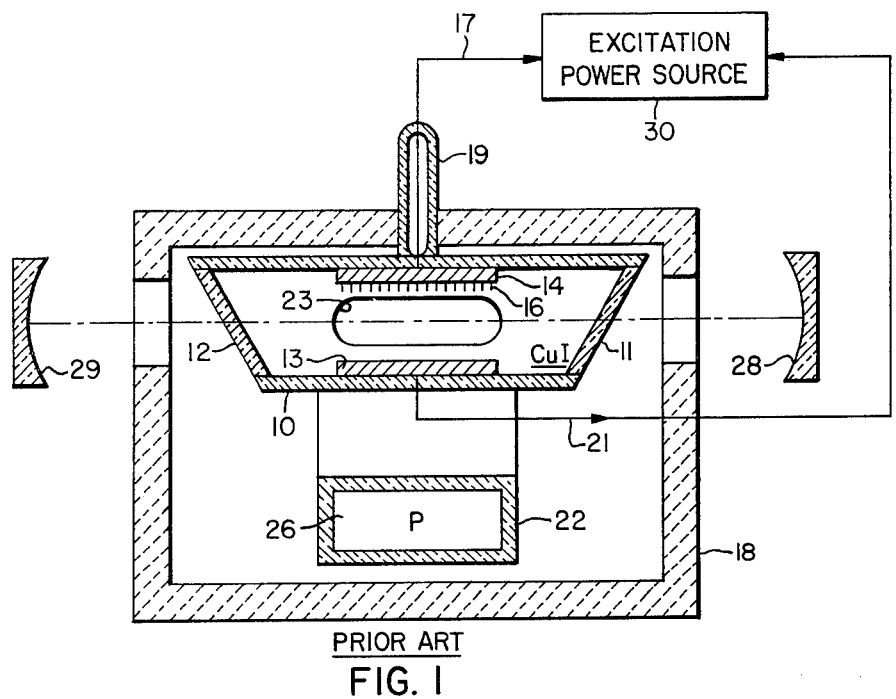
FIG. 1 is a sectioned schematic illustration of a prior art flowing metal halide laser system of the type illustrated in above-referenced U.S. Pat. No. 3,936,772.
Figure 2:
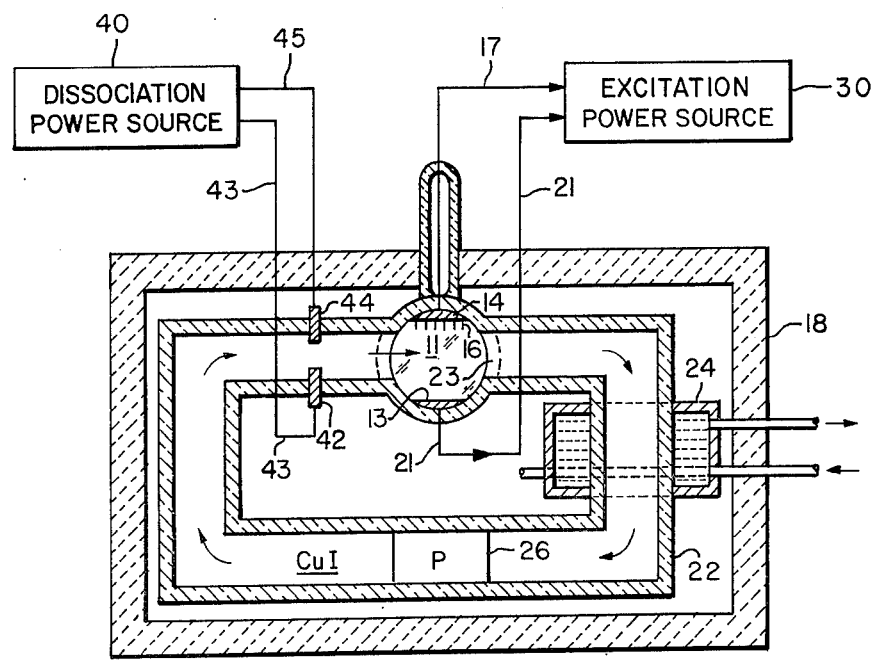
FIG. 2 is a sectioned schematic illustration of a transverse gas flow metal halide laser incorporating physically displaced dissociation and excitation means.

Referring to the prior art illustration of FIGS. 1, 2, a discharge tube 10 is shown which is preferably made from quartz, alumina, a refractory metal or the like. Discharge tube 10 includes a pair of Brewster angle windows 11 and 12 located at either end of the discharge tube 10, respectively. Positioned within discharge tube 10 and along the optical axis thereof are a pair of electrodes 13 and 14. Electrode 14 may consist of a plurality of pin-like projections extending toward the optical axis of the discharge tube 10. Electrode 14 is connected to a power source 30 by means of electrical lead 17. The discharge tube 10 is positioned within an electrical resistance oven 18. Electrical lead 21 connects electrode 13 to the power supply.

Discharge tube 10 includes a closed loop 22 to provide a transverse flow of the metal halide laser medium across the optical axis of the discharge tube 10. Loop 22 comprises an inlet opening 23 and a heat exchanger 24. The mixture of the metal halide vapor laser medium comprising metal halides, halogen and metal atoms, after passing through heat exchanger 24 passes through pump 26, which is preferably a non-mechanical pump, such as a magnetohydrodynamic pump. The vaporous mixture is thereafter passed transversely to discharge tube 10 through the tubular gas loop 227. The gaseous mixture as it passes through loop 22 to inlet opening 23 is subjected to energetic electrons provided by electrodes 13 and 14. It is clear that means other than closed loop 22 can be utilized to create a transverse gas flow.

Also included are a pair of mirrors 28 and 29 located along the optical axis for resonating the stimulated emissions. Mirror 28 is preferably 100% reflective at the desired wavelength, whereas mirror 29 is approximately 90% reflective at that wavelength. Accordingly, laser output light is transmitted through mirror 29 to external optical elements, not shown.

Oven 18 is provided to maintain discharge tube 10 and loop 22 at a predetermined operating temperature, which by way of example, is approximately 675° C. for copper iodide.

The prior art schematic illustration of a transverse gas flow metal halide vapor laser system of FIG. 1 is modified in the schematic illustration of FIG. 2 to include a dissociation power source 40 connected to dissociation pulse electrodes 42 and 44 via electrical leads 43 and 45, respectively. The dissociation pulse electrodes 42 and 44 are positioned upstream of the excitation electrodes 13 and 14 which are connected to the excitation power source 30.

Figure 3:
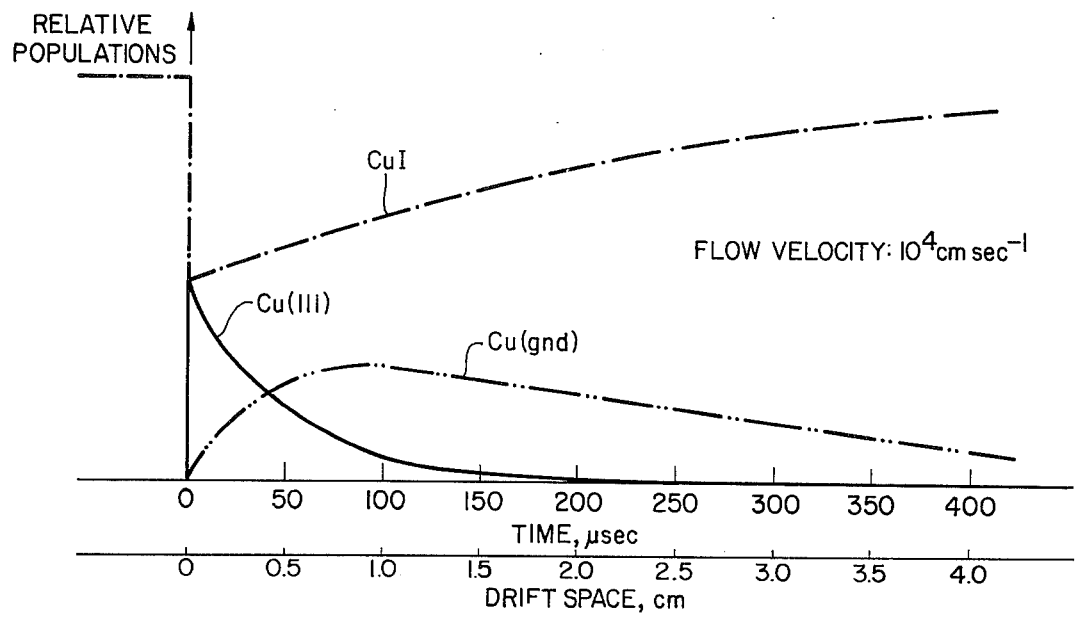
FIG. 3 is a graphical illustration of the operational characteristics of the embodiment of FIG. 2.

The thermal evolution of CuI molecules, copper atoms in the lower laser level Cu(1ll) and copper atoms in the ground state Cu(gnd), after application of a dissociation pulse from the dissociation pulse source 40 to the dissociation electrodes 42 and 44 is graphically illustrated in FIG. 3.

Referring to FIG. 3, at time $t = 0$, the CuI density experiences a step decrease due to dissociation, but recovers to its original level with a time constant of about 250 microseconds due to recombination. The Cu(lll) density experiences a step increase at time $t = 0$ due to reaction during the dissociation process, but relaxes to 0 with a 50 microsecond time constant due to conversion to Cu(gnd) during wall collisions. The Cu(gnd) density is 0 at time $t = 0$, assuming that all Cu atoms are created in the lower laser level (lll). However, the Cu(gnd) density increases with a 50 microsecond time constant, obtains a maximum value at a time of approximately $t = 50$ microseconds, a first drift time, and relaxes to 0 at approximately $t = 250$ microseconds, a second drift time, as recombination becomes complete. It is apparent that although the Cu(lll) population is too high for laser inversions initially, conditions become appropriate for laser action at about a time of $t = 50$ microseconds. These laser conditions continue until approximately $t = 250$ microseconds, at which time insufficient copper atoms are available to sustain threshold inversion. The temporal history of discharge species illustrated in FIG. 3 conforms to experimentally observed laser behavior.

The time behavior of FIG. 3 can be transformed into a spatial dependence in terms of the drift space, $d$, indicative of the spacing between the dissociation electrodes and the leading edge of the excitation electrodes 13 and 14, by assuming a transverse gas flow at velocity $v$, such that the metal halide gas at downstream locations, corresponding to the electrodes 13 and 14, has experienced a time delay with respect to the upstream location corresponding to the dissociation electrodes 42 and 44. If $v = 10^4$ centimeters/seccond, then the alternate spatial scale in centimeters shown in FIG. 3 applies to the flowing metal halide laser system at a given instant of time. Thus, dissociation at a drift location corresponding to $d = 0$, would result in suitable laser excitation conditions between locations $d = 0.5$ and $d = 2.5$ centimeters, with the first 0.5 centimeters providing the 50 microsecond delay necessary for Cu(lll) atoms to convert to Cu(gnd) atoms. The metal halide laser gas flow translates the temporal delay requirement of double-pulsed static systems into a simple spatial separation of the dissociation and excitation locations corresponding to dissociation electrodes 42 and 44 and excitation electrodes 13 and 14, respectively.

The implementation of this concept, as typically illustrated in the schematic embodiment of FIG. 2, permits separate optimization of dissociation and excitation functions, and permits laser pulse repetition rates significantly higher than those available from conventional metal halide laser systems.

Figure 4:
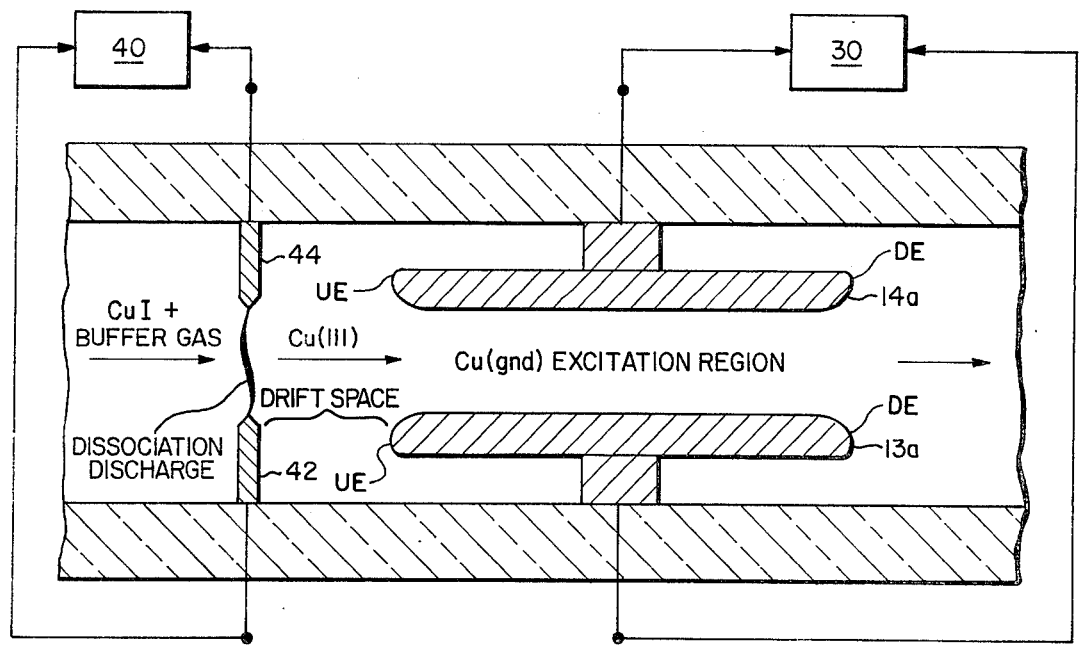
FIGS. 4 and 5 are schematic illustrations of electrode configurations for the embodiment of FIG. 2.
Figure 5:
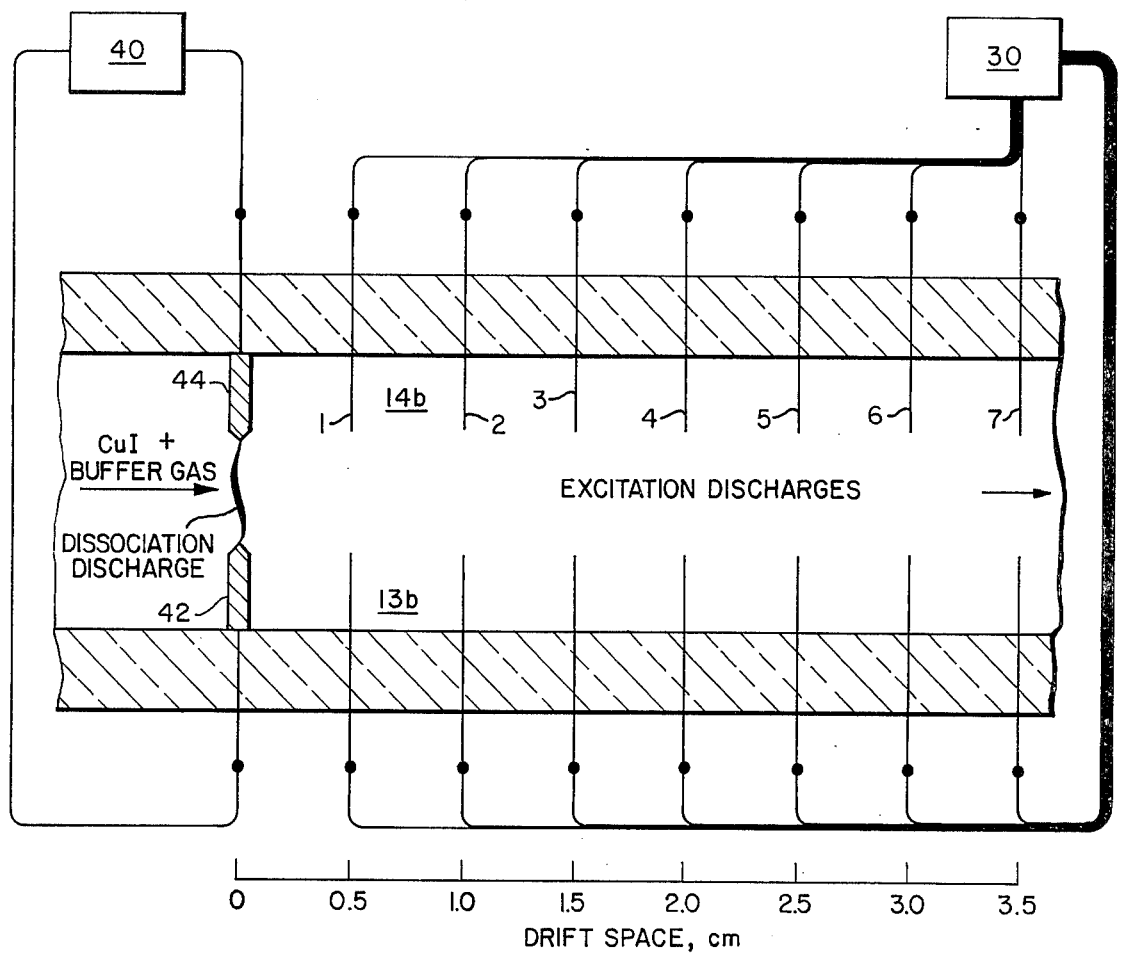

Specific implementations of dissociation electrodes and excitation electrodes in accordance with the above discussion are schematically illustrated in FIGS. 4 and 5. The implementation schematically illustrated in FIG. 4 employs dissociation electrodes 42 and 44 which respond to continuous excitation from the dissociation power source 40 to maintain an arc between the dissociation electrodes 42 and 44 to continuously create copper atoms through thermal and/or electrical dissociation of the flowing copper halide laser gas. The drift space corresponding to $d = 0.5$ centimeters provides relaxation of the copper atoms to the ground state for flow velocity of $10^4$ centimeters second$^{-1}$, with a 2 centimeter long region corresponding to the length of the planar excitation electrodes 13a and 14a being employed to excite the relaxed but dissociated medium. The planar excitation electrodes 13a and 14a extend in a downstream direction from an upstream edge UE to the end of the Cu(gnd) region corresponding to the downstream edge DE. It is apparent that the volume defined between the planar excitation electrodes 13a and 14a can be reexcited each 50 microseconds since a continuous supply of relaxed Cu(gnd) is provided at the upstream edge UE, and the downstream edge DE sees relaxed Cu(gnd) atoms after a time delay of 50 microseconds. The transport time of the atoms from the dissociation electrodes 42 and 44 to the downstream edge DE of the electrodes 13a and 14a is approximately 250 microseconds. Thus, the maximum pulse repetition frequency, prf, is 20 kHz as in a static system, but it is obtained with a much simpler continuously operating arc dissociation mode of operation. The excitation and dissociation power sources 30 and 40, and their corresponding excitation and dissociation electrodes, are physically and operationally independent, and thus can be optimized individually for desired laser operation.

Since the upstream edge UE of the excitation electrodes 13a and 14a receives a continuous supply of Cu(gnd) atoms as a result of the continuous dissociation provided by the dissociation electrodes 42 and 44, it is apparent that the excitation region, defined as the volume between the planar excitation electrodes 13a and 14a can be excited at any arbitrarily high repetition rate established by the excitation power source 30. The repetition rate is not limited by diffusion times inasmuch as the diffusion time is provided for by the drift space between the dissociation electrodes 42 and 44 and the excitation electrodes 13a and 14a.

Referring to FIG. 5, the planar excitation electrodes 13a and 14a of FIG. 4 have been replaced by an x-y array of pin electrodes 13b and 14b. In accordance with the above discussion, a first row of pins (1) positioned at a drift space of $d = 0.5$ centimeters downstream from the dissociation electrodes 42 and 44 can be pulsed by the excitation power source 30 at any desired prf. Since the maximum prf is no longer limited to the minimum relaxation time of the laser gas species, significantly higher pulse repetition rates and average laser power output are available. Succeeding rows of pins positioned downstream from the dissociation electrodes 42 and 44 at intervals corresponding to drift spaces of $d = 1.0$ centimeters, $d = 1.5$ centimeters, $d = 2.0$ centimeters, $d = 2.5$ centimeters, etc., can also be pulsed at similarly high rates by the excitation power source 30 since each successive row of pins will always see Cu(gnd) atoms relaxed by the preceding intervals or drift spaces. The dissociation electrodes 42 and 44 could operate continuously in response to the dissociation power supply 40 as described above, or could be pulsed in synchronism with the pulsed excitation of the pin electrodes 13b and 14b by the excitation power source 30.

Thus, the above embodiments illustrate a novel approach for increasing the pulse repetition rate capability of a metal halide laser system through drift space relaxation accomplished by the combination of transverse metal halide laser gas flow and spatially separated dissociation and excitation electrodes.

While the embodiments illustrated above employ an arc sustaining dissociation electrode configuration to achieve the desired dissociation function, dissociation can be similarly realized through the use of flash lamps, nuclear sources, electron beams, microwave discharges, chemical reactions, X-Ray sources and thermal sources.

What we claim is:

1. In a metal halide laser system, the combination of:
    a laser housing containing a metal halide gas laser medium,
    flow means for establishing a predetermined flow rate of said metal halide gas laser medium through said housing,
    dissociation electrode means positioned at a first location in the flow of said metal halide gas laser medium in said laser housing,
    excitation electrode means positioned at a second location downstream from said dissociation electrode means at a predetermined distance from said dissociation electrode means, said predetermined flow rate and said predetermined distance defining a drift time of the flow of said metal halide laser gas medium between said dissociation electrode means and said excitation electrode means,
    a first electrical excitation means operably connected to said dissociation electrode means to produce molecular dissociation of the flowing metal halide laser gas medium and generate metastable atoms at a laser level above ground, said predetermined flow rate and said predetermined distance between said dissociation electrode means and said excitation electrode means producing relaxation of said atoms to a ground state at said second location,
    second electrical excitation means operably connected to said excitation electrode means to create a population inversion in said flowing metal halide laser gas medium, and
    optical means positioned relative to said excitation electrode means to define an optical laser cavity for extracting laser output light.

2. In a metal halide laser apparatus as claimed in claim 1 wherein said excitation electrode means is spaced apart from dissociation electrode means to a distance to establish a drift time of approximately 50 microseconds at said predetermined flow rate of said metal halide gas laser medium.

3. In a metal halide laser apparatus as claimed in claim 1 wherein said electrical excitation means connected to said excitation electrode means consists of a pulsed dc excitation source.

4. In a metal halide laser apparatus as claimed in claim 3 wherein said pulsed dc excitation source excites said excitation electrodes at a pulse repetition rate such that the period between pulses corresponds to said drift time.

5. In a metal halide laser apparatus as claimed in claim 1 wherein said excitation electrodes are spaced apart electrodes defining a laser discharge volume therebetween, said excitation electrodes extending for a length in the direction of said flow of said metal halide laser gas medium such that at said predetermined flow rate of the gas the transport time of the atoms for the dissociation electrode means to the downstream edge of the excitation electrodes results in the recombination of the metal halide atoms at said excitation electrodes.

6. In a metal halide laser apparatus as claimed in claim 5 wherein said predetermined flow rate and said length of said excitation electrodes establishes a transport time of the atoms from the dissociation electrode means to the downstream edge of the excitation electrodes of approximately 250 microseconds.

7. In a metal halide laser apparatus as claimed in claim 5 wherein said excitation electrodes are planar electrodes.

8. In a metal halide laser apparatus as claimed in claim 1 wherein said excitation electrode means consists of spaced-apart excitation electrodes defining a discharge volume therebetween, at least one of said excitation electrodes consisting of pin electrodes separated in a downstream direction of said flow of said metal halide laser gas medium at distances corresponding approximately to said drift time.

9. In a metal halide laser apparatus as claimed in claim 8 wherein said electrical excitation means connected to said excitation electrode means consists of a pulsed DC excitation source.

* * * * *